United States Patent [19]
Lentz

[11] 4,000,467
[45] Dec. 28, 1976

[54] AUTOMATIC REPEATER STRESSING

[75] Inventor: George Howard Lentz, Andover, Mass.

[73] Assignee: Bell Telephone Laboratories, Incorporated, Murray Hill, N.J.

[22] Filed: Oct. 24, 1975

[21] Appl. No.: 625,481

[52] U.S. Cl. .................................. 325/2; 325/62
[51] Int. Cl.² ................................... H04B 1/60
[58] Field of Search ............... 325/2, 9, 11, 13, 62, 325/64, 65; 178/70 R

[56] References Cited
UNITED STATES PATENTS

| | | | |
|---|---|---|---|
| 3,440,539 | 4/1969 | Hamming | 325/2 X |
| 3,898,564 | 8/1975 | Waldhauer et al. | 325/13 |

OTHER PUBLICATIONS

Transmission Systems for Communications, 4th Ed. Revised, Section 8.4 Dec. 1971, "Noise and PCM Signals" FIG. 8–13, pp. 215–219.

Primary Examiner—Benedict V. Safourek
Attorney, Agent, or Firm—Russell H. Tobe

[57] ABSTRACT

The downconverter in a digital radio repeater is normally connected to a bias which causes the converter to perform at optimum efficiency in developing an intermediate frequency (IF) signal. This IF signal is then processed in an IF section which is gain controlled by an automatic gain control (AGC) signal. The AGC signal is compared with a reference voltage to develop an error signal which is in turn amplified to produce a stressing bias voltage. During periods of repeater testing a remotely originated command signal causes a switching circuit to be activated resulting in the application of the stressing voltage to the downconverter in place of the normal bias. As a result a predetermined signal-to-noise ratio is established in the digital repeater regardless of variations in the input signal level due to differences in repeater spacing or atmospheric conditions.

3 Claims, 1 Drawing Figure

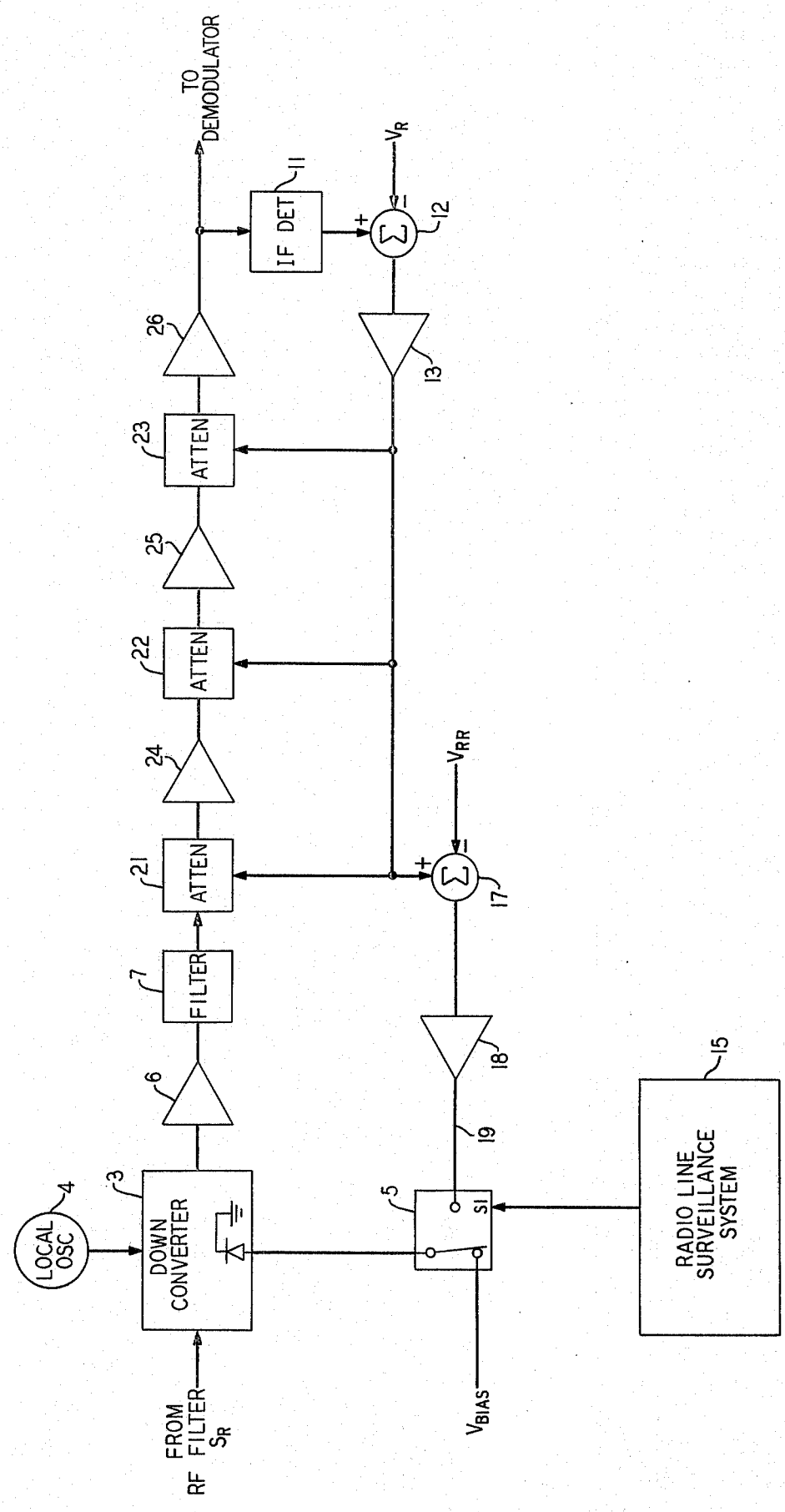

AUTOMATIC REPEATER STRESSING

BACKGROUND OF THE INVENTION

This invention relates to repeater stressing circuits and more particularly to circuits for remotely stressing digital radio repeaters independent of repeater spacing and received signal strength.

Digital radio systems generally require a plurality of regenerative repeaters along the transmission path to reconstruct the digital signal to overcome the degrading effects of noise and distortion. The distance between repeaters is chosen to maintain an adequate signal-to-noise ratio for essentially error free performance. As the signal-to-noise ratio decreases along the transmission path the error rate at the terminal end of the digital transmission path increases proportionately. It is therefore important to maintain an adequate signal-to-noise ratio at all points along the transmission path. A decrease in signal-to-noise ratio may be caused by, among other things, rain fade, transmitter power loss or by a failure in the regenerative repeater itself.

Testing of regenerative repeater performance in a digital radio system is an important aspect of transmission system maintenance. The numerous regenerative repeaters, however, are frequently positioned at locations which are difficult for a craftsman to reach for field testing. Field testing of repeater function is accordingly difficult, time consuming and expensive.

It is an object of the invention to enable all regenerative repeaters in a digital radio transmission system to be tested without the necessity of dispatching a craftsman to the field location of each repeater. Such test apparatus for each regenerative repeater must be capable of being remotely activated. In addition, inasmuch as atmospheric conditions tend to change the signal-to-noise ratio along a digital radio transmission path, the operation of such testing apparatus must be independent of received signal strength at any repeater and independent of repeater spacing.

SUMMARY OF THE INVENTION

In accordance with the present invention, a predetermined value of signal-to-noise ratio is established in a digital repeater during repeater testing by causing the converter loss to be a function of an AGC voltage. The AGC voltage is compared with a preset voltage in order to develop an error signal. This error signal is then amplified to produce a stressing voltage which is used during repeater testing to control the converter loss or efficiency. As a result, a predetermined value of signal-to-noise ratio can be established even where there are variations in repeater spacing and transmission loss. The invention takes advantage of the existing repeater circuitry and AGC feedback voltage to generate the stressing voltage. When activated, a switch which is located at the repeater site causes the stressing voltage to be applied to the repeater downconverter. This switch is remotely activated thereby obviating the need for a craftsman to field test each repeater.

BRIEF DESCRIPTION OF THE DRAWING

The single FIGURE is a schematic block diagram of the receiver section of a repeater employing an embodiment of the invention.

DETAILED DESCRIPTION

In the FIGURE, a modulated radio frequency received signal is applied to downconverter 3, and a sinusoidal signal from local oscillator 4 whose frequency is the sum of the radio frequency and an intermediate frequency is also applied to downconverter 3. Under normal operating conditions, an optimum constant bias voltage $V_{BIAS}$ is applied via switch 5 to the down-converter to minimize downconverter losses. The downconverter produces by a heterodyning process an IF (intermediate frequency) signal which is processed by amplifier 6 and bandpass filter 7 which rejects out-of-band noise. The IF signal is then processed by an arrangement of attenuators 21, 22 and 23, and amplifiers 24, 25 and 26. The output of amplifier 26 at node 10 is applied to a demodulator (not shown) which recovers the baseband signal. The baseband signal in turn is applied to a regenerator (not shown) and the regenerated signal is applied to a transmitter (not shown) for broadcast to the next repeater along the digital transmission path. The signal at node 10 applied to the demodulator may be represented by $$S_M = GS_R/L_D = GS_{DC}  \quad 1.$$

where G is the gain of the IF section located between the downconverter and the demodulator, $S_R$ is received signal strength, $L_D$ is the downconverter conversion loss for normal bias $V_{BIAS}$, and $S_{DC}$ is the IF signal out of the downconverter.

An IF detector 11 detects the envelope of the signal at node 10. This envelope $V_D$ and a predetermined factory set voltage $V_R$ are applied to comparator 12 which produces as its output an error voltage $E_{AGC}$. The error signal may be represented by $$E_{AGC} = V_D - V_R = K_D S_M - V_R \quad 2.$$

where $V_R$ is the reference voltage applied to comparator 12 and $K_D$ is the IF detector 11 sensitivity factor. This error voltage is in turn amplified by high gain amplifier 13. The AGC amplifier 13 output may be represented as $$V_N = K_{AGC} E_{AGC} \quad 3.$$

where $K_{AGC}$ is the gain of amplifier 13. The output of amplifier 13 is an AGC voltage applied as a feedback signal to attenuators 21, 22 and 23. The AGC feedback voltage may theoretically be applied to control either the loss of the attenuators or the gain of amplifiers 24, 25 and 26. This AGC feedback voltage controls the gain G of the IF section of the receiver and maintains the signal level applied to the demodulator nearly constant. It can be shown that $$G = K_A V_N \quad 4.$$

where $K_A$ is the variable attenuator sensitivity factor. Operation of the AGC feedback loop drives the error signal $E_{AGC}$ towards zero and increases the gain of the IF section to maintain the signal at node 10 applied to the demodulator at a constant level even when the received signal level into the downconverter 3 diminishes. The amplified AGC feedback signal is thus inversely proportional to the received signal strength. Equations 1–4 can be solved for $$S_M = \frac{\frac{S_R K_A K_{AGC}}{L_D} V_R}{\frac{S_R K_A K_{AGC} K_D}{L_D} - 1} \qquad (5)$$

For large gain $K_{AGC}$, equation (5) can be approximated by $$S_M = \frac{V_R}{K_D} \qquad (6)$$

Thus for large gain $K_{AGC}$, $S_M$ is independent of received signal strength. Equations (1) and (4) may be solved for $$V_N = \frac{L_D}{K_A} \frac{S_M}{S_R} \qquad (7)$$

Substituting the expression for $S_M$ in equation (6) into equation (7) gives $$V_N = \frac{V_R L_D}{K_A K_D} \frac{1}{S_R} \qquad (8)$$

Thus the AGC feedback signal $V_N$ is inversely proportional to the received signal strength and directly proportional to the downconverter loss and to reference voltage $V_R$.

To stress a given repeater, a stress command is transmitted over a radio line surveillance system 15 to switch 5 which switches to downconverter 3 a bias voltage $V_{DC}$ on lead 19 which is different than the optimum bias voltage thereby producing a significant reduction in downconverter efficiency. Hence, under stress conditions, a reduction in downconverter efficiency results in a signal degradation and a predetermined decrease of signal-to-noise ratio and a predetermined increase of the error rate at the terminal and of the radio system. The downconverter efficiency may be represented by $$L_D = K_{DC} V_{DC} \qquad 9.$$

where $L_D$ is downconverter loss and $K_{DC}$ is the downconverter sensitivity factor. Bias voltage $V_{DC}$ derived from a comparison in comparator 17 of the AGC feedback voltage $V_N$ and a factory set reference voltage $V_{RR}$, may be represented by $$V_{DC} = K_N(V_N - V_{RR}) \qquad 10.$$

Where $K_N$ is the gain of amplifier 18.

When the received signal varies in amplitude, the stressing voltage varies. The variations in the stressing voltage level compensate for fluctuations in received signal strength thereby making the stressing scheme independent of received signal strength and repeater spacing. Stated alternatively, the variable stress voltage guarantees sufficient downconverter loss to change the effective received signal strength to compensate for differences in repeater spacing.

The reference voltage $V_{RR}$ is set so that it corresponds to a threshold acceptable signal-to-noise ratio and error rate at the radio system terminal end. It will be shown mathematically that under stress conditions with the use of the two high gain feedback amplifiers 13 and 18, the signal-to-noise ratio at the demodulator is independent of received signal level and dependent only on the two preset reference voltages.

The noise power $N_M$ at the demodulator input may be expressed in terms of thermal noise $N_D$ at the downconverter output as $$N_M = N_D G N_F B \qquad 11.$$

where $N_F$ is the receiver noise figure and $B$ is the noise bandwidth of bandpass filter 7.

Since the AGC feedback loop holds the signal at node 10 constant at $V_R/K_D$ (equation 6) the signal-to-noise ratio at the demodulator input from equations (6) and (11) is $$\frac{S_M}{N_M} = \frac{V_R}{K_D(N_D K_A V_N N_F B)} = K_1 \frac{V_R}{V_N} \qquad (12)$$

where $$K_1 = 1/K_D N_D K_A N_F B.$$

The automatic signal-to-noise ratio loop consisting of comparator 17, amplifier 18 and switch 5 decreases downconverter efficiency until $V_N$ equals $V_{RR}$. This can be shown by solving equations (8), (9) and (10) for $$V_N = \frac{\frac{V_R K_{DC} K_N}{K_D K_A S_R} V_{RR}}{\frac{V_R K_{DC} K_N}{K_D K_A S_R} - 1} \qquad (13)$$

For large gain $K_N$ $$V_N = V_{RR} \qquad 14.$$

and substituting $V_{RR}$ for $V_N$ in equation (12), the signal-to-noise ratio becomes $$(S_M/N_M) = K_1(V_R/V_{RR}) \qquad 15.$$

Hence, the signal-to-noise ratio is independent of repeater spacing and received signal strength and dependent only on the value of the two factory set constants $V_R$ and $V_{RR}$.

Under stress conditions a test signal with a known pattern is applied at the radio system input. The error rate of the radio system output should be less than the predetermined rate if the repeater under stress is functioning properly. If the error rate at the terminal end of the radio system exceeds its predetermined value, the repeater under stress is presumed defective and may be conveniently replaced.

In all cases it is to be understood that the above described arrangements are merely illustrative of a small number of the many possiblie applications of the principles of the invention. Numerous and possible other arrangements in accordance with these principles may readily be devised by those skilled in the art without departing from the spirit and scope of the invention.

What is claimed is:

1. In a digital repeater having a converter and an AGC feedback loop in which an AGC signal is developed, apparatus for stressing said repeater in response to a stress command signal comprising:

a comparator having two inputs and an output;

means for applying said AGC signal to one of said two inputs of said comparator;

means for applying a reference signal to the other one of said two inputs of said comparator;

means for amplifying said output of said comparator to produce a stressing voltage; and means responsive to said stress command signal for switching said stressing voltage to said converter of said repeater thereby increasing the loss in said converter.

2. In a digital repeater having a converter and an AGC loop in which an AGC voltage is developed, apparatus for establishing a predetermined signal-to-noise ratio comprising:

means for comparing said AGC voltage to a preset voltage in order to develop an error signal;

amplifying means responsive to said error signal for producing an amplified error signal;

switching means having a control input for selectively coupling said amplified error signal to said converter to control the loss of said converter when its control input is activated; and means for remotely activating the control input of said switching means.

3. A digital radio repeater for use with a radio frequency signal comprising:

means for converting said radio frequency signal to an intermediate frequency signal having an amplitude envelope;

means for processing said intermediate frequency signal;

means for detecting said envelope of said intermediate frequency signal;

means for comparing said detected envelope to a first reference signal to produce a first error signal;

amplifying means responsive to said first error signal for producing a feedback signal applied to control the gain of said means for processing an intermediate frequency signal;

means for comparing said feedback signal with a second reference signal to produce a second error signal;

second amplifying means responsive to said second error signal for producing an amplified second error signal; and switching means responsive to a remote stress command for applying said second amplified error signal to said means for converting said radio frequency signal thereby controlling the efficiency of said means for converting.

* * * * *